(12) United States Patent
Goek et al.

(10) Patent No.: US 10,710,572 B2
(45) Date of Patent: Jul. 14, 2020

(54) METHOD FOR OPERATING A DRIVE TRAIN OF A MOTOR VEHICLE HAVING A COMBUSTION ENGINE AND A FURTHER MACHINE

(71) Applicant: Robert Bosch GmbH, Stuttgart (DE)

(72) Inventors: Alper Goek, Schwenningen (DE); Matthias Ege, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 16/133,150

(22) Filed: Sep. 17, 2018

(65) Prior Publication Data

US 2019/0092314 A1    Mar. 28, 2019

(30) Foreign Application Priority Data

Sep. 28, 2017    (DE) .......................... 10 2017 217 284

(51) Int. Cl.
| | |
|---|---|
| *B60W 20/16* | (2016.01) |
| *B60K 6/12* | (2006.01) |
| *B60K 6/20* | (2007.10) |
| *B60W 10/06* | (2006.01) |

(Continued)

(52) U.S. Cl.
CPC .............. *B60W 20/16* (2016.01); *B60K 6/12* (2013.01); *B60K 6/20* (2013.01); *B60W 10/06* (2013.01); *B60W 10/08* (2013.01); *B60W 2710/06* (2013.01); *B60W 2710/08* (2013.01); *B60Y 2200/92* (2013.01); *F01N 13/008* (2013.01);

(Continued)

(58) Field of Classification Search
CPC ...... B60W 20/10; B60W 20/12; B60W 20/15; B60W 20/16; B60W 20/40; B60W 2510/068; B60W 2710/0694; Y02T 10/26; Y02T 10/6286; F01N 2900/1404; F01N 2900/1602
See application file for complete search history.

(56) References Cited

U.S. PATENT DOCUMENTS 6,327,852 B1 *  12/2001  Hirose ................... B60K 6/445
                                                                60/297
6,359,404 B1 *  3/2002  Sugiyama ................ B60K 6/48
                                                                318/432

(Continued)

FOREIGN PATENT DOCUMENTS

DE         19836955 A1 *  3/2000
DE      102015204093 A1 *  9/2016

(Continued)

OTHER PUBLICATIONS

EPO machine translation of DE 19836955 (original DE document published Mar. 9, 2000) (Year: 2000).*

*Primary Examiner* — Faris S Almatrahi
*Assistant Examiner* — David A Testardi
(74) *Attorney, Agent, or Firm* — Norton Rose Fulbright US LLP; Gerard Messina

(57) ABSTRACT

A method for operating a drive train of a motor vehicle having a combustion engine and a further machine, the two drives proportionally supplying a torque for the motor vehicle, and a temperature of an exhaust gas of the motor vehicle is ascertained and the shares of the generated torque by the combustion engine and the further machine are adapted as a function of the temperature of the exhaust gas.

11 Claims, 3 Drawing Sheets

(51) Int. Cl.
    *B60W 10/08*     (2006.01)
    *F01N 13/00*     (2010.01)

(52) U.S. Cl.
    CPC ... *F01N 2590/11* (2013.01); *F01N 2900/1404* (2013.01); *Y02T 10/6286* (2013.01)

(56) References Cited

U.S. PATENT DOCUMENTS

| | | | | |
|---|---|---|---|---|
| 6,568,173 | B1* | 5/2003 | Kolmanovsky | F01N 3/023 60/274 |
| 2002/0038654 | A1* | 4/2002 | Sasaki | B60K 6/485 123/568.11 |
| 2002/0092297 | A1* | 7/2002 | Hertzberg | F01N 3/0842 60/295 |
| 2007/0240921 | A1* | 10/2007 | Katzenberger | B60K 6/48 180/65.28 |
| 2008/0078166 | A1* | 4/2008 | Rose | B60K 6/46 60/284 |
| 2009/0077951 | A1* | 3/2009 | Arlt | F02D 41/0245 60/286 |
| 2009/0141768 | A1* | 6/2009 | He | G01K 7/42 374/144 |
| 2010/0043404 | A1* | 2/2010 | Hebbale | F01N 9/00 60/286 |
| 2010/0154389 | A1* | 6/2010 | Schumacher | F01N 9/002 60/286 |
| 2011/0139524 | A1* | 6/2011 | Heinrich | B60K 6/48 180/65.265 |
| 2012/0079822 | A1* | 4/2012 | Yacoub | B60W 10/06 60/597 |
| 2012/0090301 | A1* | 4/2012 | Sujan | B60W 10/06 60/277 |
| 2013/0231842 | A1* | 9/2013 | Hammer | B60W 20/00 701/102 |
| 2014/0013726 | A1* | 1/2014 | Yacoub | F01N 3/32 60/274 |
| 2015/0020503 | A1* | 1/2015 | Adelman | F01N 3/021 60/274 |
| 2015/0233314 | A1* | 8/2015 | Stenlaas | F02D 41/024 701/51 |
| 2018/0170349 | A1* | 6/2018 | Jobson | B60L 7/18 |
| 2019/0003365 | A1* | 1/2019 | Dhanraj | F01N 9/002 |

FOREIGN PATENT DOCUMENTS

| | | |
|---|---|---|
| DE | 102015226216 A1 | 5/2017 |
| DE | 102016219039 A1 * | 5/2017 |
| EP | 2565413 A1 * | 3/2013 |
| FR | 2784626 A1 * | 4/2000 |
| GB | 2500923 A * | 10/2013 |
| GB | 2503725 A * | 1/2014 |
| JP | 2011194926 A * | 10/2011 |

* cited by examiner

METHOD FOR OPERATING A DRIVE TRAIN OF A MOTOR VEHICLE HAVING A COMBUSTION ENGINE AND A FURTHER MACHINE

FIELD OF THE INVENTION

The present invention relates to a method for operating a drive train of a motor vehicle having a combustion engine and a further machine. In addition, the present invention relates to a computer program, which is developed to execute one of the present methods.

BACKGROUND INFORMATION

In the course of the ever stricter regulatory provisions for new motor vehicles, in particular also for hybrid vehicles, exhaust-gas aftertreatment devices must be used for the aftertreatment of the exhaust gases produced during the combustion so that the produced emissions are reduced to the limit value prescribed by the regulations.

It is problematic in this context that partially very high temperatures are produced by the exhaust gas, in particular in nonstationary operating points of the combustion engine, so that the exhaust-gas aftertreatment systems situated in the exhaust-gas tract have to be protected from the effects of excessive heat.

German Published Patent Application No. 10 2015 226 216 describes a method and a device for operating a motor vehicle (2) having a hybrid drive, which is made up of a combustion engine (3) and an electric machine (4), both of which are acting on a shared hybrid drive train (1); in order to operate components of an exhaust-gas aftertreatment system (20), the combustion engine (3) is at least intermittently operated in a phase featuring a rich air/fuel mixture or it is operated using an exhaust-gas recirculation in order to lower the exhaust-gas temperature. When a greater load requirement arises for the combustion engine (3) during the phase in which a rich air/fuel mixture is used for the operation, or during the phase when the operation features an exhaust-gas recirculation, the torque (MD_VKM) of the combustion engine (3) is kept constant and the additional torque required on account of the greater load requirement is supplied exclusively by the electric machine (4).

SUMMARY

The present invention relates to a method for operating a drive train of a motor vehicle having a combustion engine and a further machine, and it relates to a computer program on a memory medium for executing the present method.

In a first aspect, the present invention relates to a method for operating a drive train of a motor vehicle having a combustion engine and a further machine, the two drives proportionally supplying a torque for the motor vehicle; in the process, a temperature of an exhaust gas of the motor vehicle is ascertained and the shares of the torque generated by the combustion engine and the further machine are adapted as a function of the temperature of the exhaust gas.

This offers the special advantage that the temperature of the exhaust gas, and thus the temperature of components disposed in the exhaust gas, is able to be adapted by adapting the torque generated by the two drives.

In an advantageous further development, the share of the torque of the additional machine is increased, and the share of the torque of the combustion engine is reduced.

The reduction in the share of the torque of the combustion engine is produced as a result of less exhaust gas, and thus also a lower temperature via the exhaust gas. This makes it possible to reduce the temperature already generated in the exhaust-gas tract by the exhaust gas.

In addition, it may be provided that the share of the torque from the additional machine is increased when the temperature of the exhaust gas exceeds a predefinable temperature.

This offers the special advantage that the predefinable temperature is able to be predefined, e.g., as a critical temperature for components located in the exhaust-gas tract, so that defects in this component as a result of overheating are able to be prevented. For this purpose, the predefinable temperature may also be selected on the conservative side. For example, if it is known that a component will most likely become defective at a temperature of 250° C., then the predefinable temperature may preferably be set to 230° C. so that temperature overswingers are able to be taken into account in the calculation.

Alternatively or additionally, the predefinable temperature may be selected in such a way that certain exhaust-gas components ensure an optimum emission conversion. This applies above all to exhaust-gas aftertreatment systems such as the selective catalytic reduction system, or to nitrogen-oxide storage catalysts (NSC systems), which have an individual working range or temperature range in order to ensure an optimal conversion of emissions.

It may furthermore be provided that the predefinable temperature is ascertained as a function of a model for a predicted route profile. This offers the advantage that because of the knowledge of the route profile, the predefinable temperature may be selected in such a way, for example, that brief exceedances of critical temperatures for the components to be protected are able to be allowed. The battery charge for the electric drive may therefore be saved when it is obvious from the route profile that the combustion engine has to process a low load, e.g., due to a coasting operation.

In an advantageous further development, the additional machine (15) is developed as an electric or a pneumatic or hydraulic machine, or it is made up of a combination of these machines.

In further aspects, the present invention relates to a device, in particular to a control unit and to a computer program, which are developed, in particular programmed, to execute one of the methods. In a still further aspect, the present invention relates to a machine-readable memory medium on which the computer program is stored.

DETAILED DESCRIPTION

Figure 1:
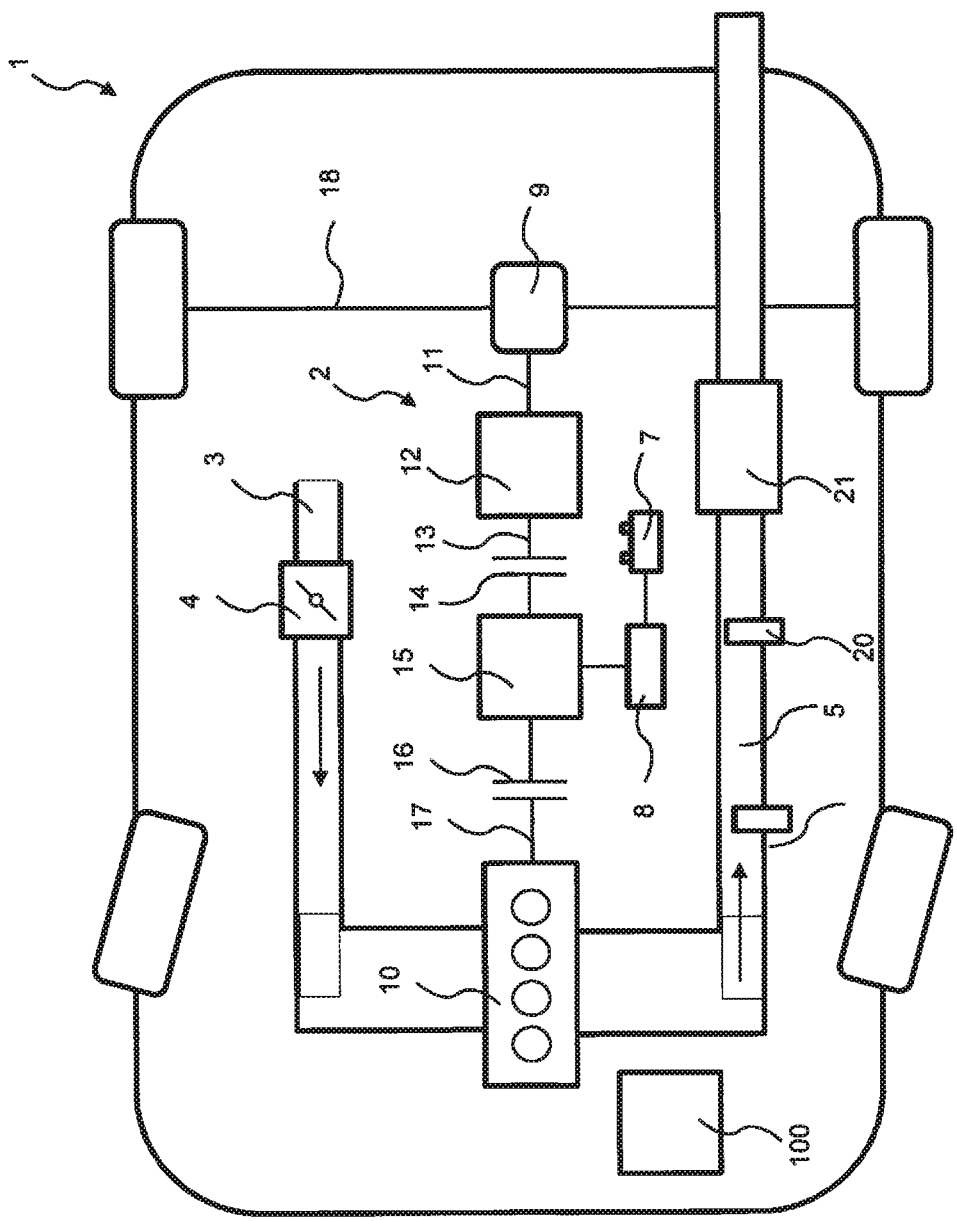
FIG. 1 shows a schematic illustration of a motor vehicle 1 having a combustion engine 10 and a hybrid drive 2.

FIG. 1 shows a schematic illustration of a motor vehicle 1 having a combustion engine 10 and a hybrid drive 2. Hybrid drive train 2 of motor vehicle 1 is made up of a combustion engine 10, preferably a diesel engine, a spark-ignition engine, a gas-powered engine or flex-fuel engine, and an electric motor 15. Electric motor 15 may preferably be developed as an electric machine which is motor-driven and which is able to be operated both in a motor mode and in a generator mode. Alternatively or additionally, hybrid drive 2 may also be configured as a pneumatic or hydraulic drive system, which—in contrast to the combustion engine—does not produce exhaust gas or heating of exhaust-gas tract 5 during the torque generation.

In addition, however, a hybrid drive 2 having an electric machine 15 is described. Another component of hybrid drive train 2 is a first clutch 16. First clutch 16 is connected to crankshaft 17 of combustion engine 10 on the one side, and to electric motor 15 on the other side, which means that this connection is able to be closed or separated with the aid of control unit 100, for instance. Using a second clutch 14, which is connected to a shaft of electric motor 15 on one side and to a transmission-input shaft 13 of a transmission 12 on the other side, this connection is able to be closed or separated. Transmission 12 is preferably developed as a manual transmission or as an automatic transmission. Transmission output shaft 11 of transmission 12 is connected to a differential gear 9 of drive axle 18 of motor vehicle 1.

With the aid of this system, the motor vehicle may be driven by combustion engine 10 on the one hand, and also by electric motor 15 or jointly by both drive systems.

The closed-loop or the open-loop control of electric machine 15 is carried out by vehicle electrical and electronic system 8. The energy for hybrid drive 2 is preferably provided by a battery 7. Preferably, battery 7 is configured for systems with a 48 volt hybrid battery. Other systems featuring up to 800 volt hybrid batteries are also suitable for the present method. Systems using other vehicle system voltages are conceivable as well. Alternatively or additionally, the supplied energy may be generated by a fuel cell.

Combustion engine 10 furthermore has an induction tract 3 by way of which fresh air for the combustion process is able to be conveyed to combustion engine 10, and it also has an exhaust-gas tract by way of which the combusted exhaust gas of the combustion is discharged. A position sensor 4, preferably a throttle valve, for controlling the air conveyed to combustion engine 10 is disposed in induction tract 3. Located downstream from combustion engine 10, i.e. along exhaust-gas tract 5, for example, is a lambda sensor 19 for analyzing the air/fuel ratio λ and for controlling the combustion of combustion engine 10. Lambda sensor 19 is connected to control unit 100, for instance, so that the signal ascertained by lambda sensor 19 is available in control unit 100 for further processing, e.g., in models. The connection may be by cable, e.g., via a CAN area network, or alternatively, it may also be wireless. With the aid of a temperature sensor 20, the temperature of the exhaust gas in exhaust-gas tract 5 is able to be measured. Alternatively or additionally, the temperature may also be ascertained with the aid of a model calculated in control unit 100. Alternatively or additionally, it is also possible to ascertain the temperature of the exhaust gas in the cylinder of combustion engine 10. Located downstream from exhaust-gas tract 5 are exhaust-gas aftertreatment systems 21 such as diesel or gasoline-particle filters, selective catalytic catalyst systems or nitrogen-oxide storage catalysts. To allow these exhaust-gas aftertreatment systems 21 to provide a satisfactory efficiency, these exhaust-gas aftertreatment systems 21 have to be operated in an individual working range or temperature range, the waste heat generated by combustion engine 10 being able to be used in the exhaust gas for the regulation. The working range of nitrogen-oxide storage catalysts (NSC) lies between 100 and 500° C., for instance. Above temperatures of 500° C., defects may occur in these exhaust-gas aftertreatment systems 21 so that exhaust-gas aftertreatment systems 21 must be protected from excessive temperatures.

The absorption capacity of NSC systems mainly depends on the temperature of the nitrogen-oxide storage catalyst, the instantaneous NOx loading and the exhaust mass flow.

If the exhaust-gas temperature becomes too high under the aforementioned marginal conditions, then the nitrogen-oxide storage catalyst releases its NOx load again. In order to prevent this, a threshold value for the temperature may be selected in such a way that this release effect is avoided or especially adjusted. The same applies to the sensors mentioned at the outset, e.g., Lambda sensor 19 or particulate sensors, etc.

Similar considerations apply also to SCR systems or to the SCR catalyst. Above a critical temperature, the SCR catalyst loses its storage capacity for ammonia to an increasing extent.

Ammonia stored in the SCR catalyst may thus be released again without entering into a catalytic effect with the NOx emissions. Such an ammonia slip should be avoided.

In addition, motor vehicle 1 has a vehicle-navigation device, which is not shown further in FIG. 1 and is preferably a global position-determination system.

Figure 2:
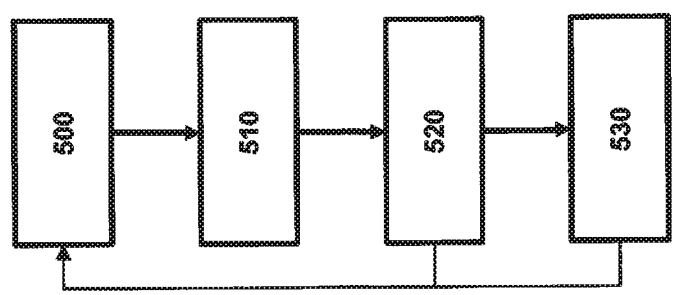
FIG. 2 shows the exemplary sequence of a first exemplary embodiment, with the aid of a flow diagram.

FIG. 2 shows a first exemplary embodiment with the aid of a flow diagram for the method for operating a drive train of a motor vehicle 1 having a combustion engine 10 and an electric motor 15.

In a first step 500, the temperature of the exhaust gas generated by combustion engine 10 is ascertained with the aid of a temperature sensor 20 or with the aid of a temperature model. Temperature sensor 20 is preferably connected to control unit 100 by a cable connection, e.g., such as in a Can Area Network. The temperature signals ascertained by temperature sensor 20 are transmitted from the sensor to control unit 100 and received and processed further by control unit 100. Alternatively or additionally, a modeled temperature is able to be ascertained for the exhaust gas with the aid of a model calculated in control unit 100. Preferably, a temperature of the exhaust gas in exhaust-gas tract 5 is calculated.

Alternatively or additionally, the temperature of the exhaust gas inside the combustion chamber of combustion engine 10 may be ascertained, e.g., in close proximity to the cylinders or at the inlet and outlet valves of combustion engine 10.

In a step 510, the temperature value for the exhaust gas, ascertained by temperature sensor 20, is compared to a first predefinable threshold value. The predefinable threshold value is selected in such a way that components that come into contact with exhaust gas or with the temperature of the exhaust gas do not sustain damage, e.g., by the effects of excessive heat. These are preferably components, e.g., elements of combustion engine 10, lambda sensors 19, particulate sensors, sensors that are disposed in exhaust-gas tract 5, or exhaust-gas aftertreatment components 21 such as diesel or gasoline particulate filters, catalysts, such as nitrogen-oxide storage catalysts or selective catalytic exhaust-gas aftertreatment systems. In the case of selectively catalytic exhaust-gas aftertreatment systems, injection valves for the injected urea disposed in exhaust-gas tract 5 must also be protected from excessive heat in exhaust-gas tract 5.

Alternatively, the predefinable threshold value may also be selected in such a way that exhaust-gas aftertreatment components such as SCR systems or NSC systems achieve an optimum efficiency in the conversion of emissions.

In this way, an undesired release of a NOx load of the NSC catalyst, for example, is able to be prevented, or in the case of SCR systems, an undesired ammonia slip due to the reduced storage capacity of the SCR catalyst is avoidable.

If it is determined in a step 520 that the ascertained temperature of the exhaust gas lies below the predefinable threshold value, then the method is continued with step 500.

If the ascertained temperature of the exhaust gas exceeds the predefinable threshold value, then the current distribution of the torque provided by combustion engine 10 and electric motor 15 is ascertained and checked by control unit 100. If the torque is already completely supplied by electric motor 15, then it is continued with step 500.

In the other case, if the ascertained temperature exceeds the predefinable threshold value, the share of the torque for motor vehicle 1 supplied by electric motor 15 is increased in such a way that the torque of combustion engine 10 is reduced. This is preferably done in such a way that the torque currently desired by the driver is maintained. However, if the torque supplied by the electric drive is not sufficient to ensure the currently requested driver-desired torque, then the requested torque will be generated with the aid of both drives, or preferably via the combustion engine, and it may be continued with step 500. For instance, this check may be carried out by monitoring load-signal information of motor vehicle 1 or driver-input information by control unit 100. Otherwise, the distribution of the torque of the two drives is adapted in such a way that the current temperature of the exhaust gas is reduced, in particular as quickly as possible. For one, this may be realized by a variable distribution of the torque between the two drives or by a complete generation of the torque by electric motor 15. The reduction of the torque supplied by combustion engine 10 causes the temperature of the exhaust gas to drop since electric motor 15 does not generate any waste heat for the exhaust gas and combustion engine 10 generates less or even no waste heat in the form of exhaust gases on account of the reduced operation or a deactivation of the combustion process. As a result, the temperature of the exhaust gas drops, and a closed-loop control of the temperature of the exhaust gas may be carried out. In the event of a switch-off, combustion engine 10 may preferably be operated in a coasting operation.

If it is determined in a step 530 that the currently ascertained temperature of the exhaust gas has dropped below the predefinable threshold value again, the share of the torque of electric motor 15 is able to be reduced and the share of the torque of combustion engine 10 may be increased. The share of the torque of electric machine 15 is preferably able to be completely reduced so that the torque for motor vehicle 1 is completely generated by combustion engine 10. The reduction of the torque by electric machine 15 preferably takes place across a predefinable period of time, i.e. the modification of the supplied torque by the two drives is carried out across a predefinable course of time, for instance, starting at a first instant and ending at a second instant. Alternatively or additionally, the distribution of the torque between the two drives may be performed in such a way that a temperature that is optimal for the exhaust-gas aftertreatment components is adjusted, for instance the temperature working ranges known for catalysts in which an optimal emission conversion is ensured. Subsequently, the present method may be continued in step 500 again.

Figure 3:
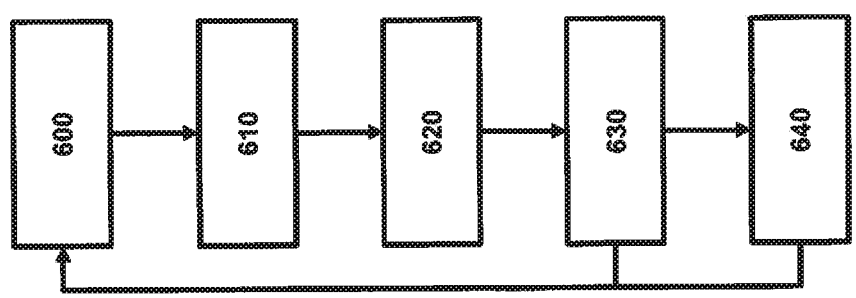
FIG. 3 shows the exemplary sequence of a second exemplary embodiment, with the aid of a flow diagram.

FIG. 3 illustrates a second exemplary embodiment with the aid of a flow diagram for the method for operating a drive train of a motor vehicle 1 having a combustion engine 10 and an electric motor 15.

In a first step 600, a predefinable route profile is analyzed, e.g., by a control unit 100. For this purpose, informational data of a navigation system of motor vehicle 1 are preferably used. These informational data may include the following information, for example: the overall route, the associated altitude profile, predefined speeds, information about the type of route to be traveled, e.g., country road, expressway, etc., information such as positions of traffic light systems and congestion reports along the predefined route profile. The congestion reports are preferably received via a traffic message service or by a cellular mobile telephony connection and are evaluated.

The evaluation of the data is preferably accomplished with the aid of control unit 100. For this purpose, the navigation device of motor vehicle 1 is connected to control unit 100, preferably by a cable or by a wireless connection.

In a step 610, the control unit subdivides the predefinable route profile into segments, and for each segment an average load is calculated from the above-mentioned information, and subsequently the exhaust-gas temperature for this segment is predicted on the basis of the load for the segment. Based on the predicted temperature for the exhaust gas, an individual threshold value for the exhaust-gas temperature is able to be ascertained for each instant on the predefinable route profile. This may preferably be done using control unit 100. Because of the individual threshold value for the exhaust-gas temperature, interventions in the distribution of the torques of the two drives are able to be avoided. For example, if a downhill drive of vehicle 1 for a longer route segment is known, then the individual threshold value may be adapted in such a way that the individual threshold value will not be exceeded and combustion engine 10 does not have to handle a load in the further route segment. Battery capacity for electric motor 15, for instance, is able to be saved due to the predictive adaptation of the individual threshold value.

In a step 620, the instantaneous temperature of the exhaust gas is ascertained, preferably with the aid of a temperature sensor 20, and subsequently compared to the individual threshold value for the exhaust-gas temperature. If the instantaneous temperature of the exhaust gas exceeds the individual threshold value for the exhaust-gas temperature, then the instantaneous distribution of the torque supplied by combustion engine 10 and electric motor 15 is ascertained and checked by control unit 100 in a step 630.

If it is determined that the torque is completely supplied by electric motor 15, then it is continued with step 620. In the other case, if the individual threshold value is exceeded by the ascertained temperature, the share of the torque for motor vehicle 1 supplied by electric motor 15 is increased in such a way that the torque of combustion engine 10 is reduced. This is preferably accomplished in such a way that the torque currently desired by the driver is maintained. However, if the torque supplied by the electric drive is not sufficient to ensure the instantaneously requested driver-desired torque, then the requested torque will be generated via both drives, or preferably via the combustion engine, and it may be continued with step 600. This check, for instance, is able to be implemented by monitoring an item of load-signal information of motor vehicle 1 or a driver-desired information, using control unit 100. On the other hand, the distribution of the torque of the two drives is adapted in such a way that the current temperature of the exhaust gas is reduced, in particular as quickly as possible. For one, this may be realized by a variable distribution of the torque between the two drives, or by a complete generation of the torque by electric motor 15.

The reduction of the torque supplied by combustion engine 10 causes the temperature of the exhaust gas to drop since electric motor 15 does not generate any waste heat for the exhaust gas, and combustion engine 10 generates less or even no waste heat in the form of exhaust gases on account of the reduced operation or the deactivation of the combustion process. As a result, the temperature of the exhaust gas drops, and a control of the temperature of the exhaust gas is able to be implemented.

If it is determined in a step 640 that the instantaneously ascertained temperature of the exhaust gas undershoots the individual threshold value again, then the share of the torque from electric motor 15 is able to be reduced and the share of the torque from combustion engine 10 may be increased. The share of the torque of the electric motor may preferably be reduced completely so that the torque for motor vehicle 1 is entirely generated by combustion engine 10. The reduction of the torque by electric motor 15 is preferably carried out across a predefinable period of time, i.e. the modification of the supplied torque by the two drives is carried out across a predefinable period of time, for instance, which starts at a first instant and ends at a second instant.

The method may subsequently be continued in step 620 again.

What is claimed is:

1. A method for operating a drive train of a motor vehicle that includes a combustion engine and a further machine, the combustion engine and the further machine proportionally generating a torque for the motor vehicle, the method comprising:
    ascertaining a temperature of an exhaust gas of the motor vehicle; and
    adapting shares of the generated torque by the combustion engine and the further machine as a function of the ascertained temperature of the exhaust gas;
    wherein when the ascertained temperature of the exhaust gas exceeds a predefinable temperature, a share of the generated torque by the further machine is increased, and
    wherein the method further comprises ascertaining the predefinable temperature as a function of a model for a predicted route profile.

2. The method as recited in claim 1, wherein a share of the generated torque by the further machine is increased and a share of the generated torque by the combustion engine is reduced.

3. The method as recited in claim 1, wherein the further machine includes one of:
    an electric machine,
    a pneumatic machine,
    a hydraulic machine, and
    a combination of at least two of the electric machine, the pneumatic machine, and the hydraulic machine.

4. The method as recited in claim 1, further comprising:
    subdividing the predicted route profile into segments;
    for each of the segments, calculating an average load using informational data of a navigation system of the motor vehicle;
    for each of the segments, predicting an exhaust gas temperature for the segment based on the calculated average load for the segment; and
    based on the predicted gas temperatures for each segment, ascertaining an individual threshold for each instant on the predicted route profile,
    wherein the predefinable temperature is ascertained using the individual thresholds.

5. The method as recited in claim 4, wherein the information data includes one or more of the following:
    an overall route of the route profile;
    an associated altitude profile of the route profile;
    predefined speeds;
    information about a type of route to be traveled;
    information regarding positions of traffic light systems along the route profile;
    congestion reports along the route profile.

6. A non-transitory electronic storage medium having a computer program for executing a method for operating a drive train of a motor vehicle that includes a combustion engine and a further machine, the combustion engine and the further machine proportionally generating a torque for the motor vehicle, the method comprising:
    ascertaining a temperature of an exhaust gas of the motor vehicle; and
    adapting shares of the generated torque by the combustion engine and the further machine as a function of the ascertained temperature of the exhaust gas,
    wherein when the ascertained temperature of the exhaust gas exceeds a predefinable temperature, a share of the generated torque by the further machine is increased, and
    wherein the method further comprises ascertaining the predefinable temperature as a function of a model for a predicted route profile.

7. The non-transitory electronic storage medium as recited in claim 6, wherein the method further comprises:
    subdividing the predicted route profile into segments;
    for each of the segments, calculating an average load using informational data of a navigation system of the motor vehicle;
    for each of the segments, predicting an exhaust gas temperature for the segment based on the calculated average load for the segment; and
    based on the predicted gas temperatures for each segment, ascertaining an individual threshold for each instant on the predicted route profile,
    wherein the predefinable temperature is ascertained using the individual thresholds.

8. The non-transitory electronic storage medium as recited in claim 7, wherein the information data includes one or more of the following:
    an overall route of the route profile;
    an associated altitude profile of the route profile;
    predefined speeds;
    information about a type of route to be traveled;
    information regarding positions of traffic light systems along the route profile;
    congestion reports along the route profile.

9. A device for executing a method for operating a drive train of a motor vehicle that includes a combustion engine and a further machine, the combustion engine and the further machine proportionally generating a torque for the motor vehicle, the method comprising:
    ascertaining a temperature of an exhaust gas of the motor vehicle; and
    adapting shares of the generated torque by the combustion engine and the further machine as a function of the ascertained temperature of the exhaust gas;
    wherein when the ascertained temperature of the exhaust gas exceeds a predefinable temperature, a share of the generated torque by the further machine is increased,
    wherein the method further comprises ascertaining the predefinable temperature as a function of a model for a predicted route profile, and
    wherein the device is a control unit including a computer.

10. The device as recited in claim 9, wherein the method further comprises:
- subdividing the predicted route profile into segments;
- for each of the segments, calculating an average load using informational data of a navigation system of the motor vehicle;
- for each of the segments, predicting an exhaust gas temperature for the segment based on the calculated average load for the segment; and
- based on the predicted gas temperatures for each segment, ascertaining an individual threshold for each instant on the predicted route profile,
- wherein the predefinable temperature is ascertained using the individual thresholds.

11. The device as recited in claim 10, wherein the information data includes one or more of the following:
- an overall route of the route profile;
- an associated altitude profile of the route profile;
- predefined speeds;
- information about a type of route to be traveled;
- information regarding positions of traffic light systems along the route profile;
- congestion reports along the route profile.

\* \* \* \* \*